United States Patent
Kim et al.

(10) Patent No.: US 10,681,297 B2
(45) Date of Patent: Jun. 9, 2020

(54) SINGLE-SLOPE COMPARISON DEVICE WITH LOW-NOISE, AND ANALOG-TO-DIGITAL CONVERSION DEVICE AND CMOS IMAGE SENSOR INCLUDING THE SAME

(71) Applicant: SK hynix Inc., Icheon-si (KR)

(72) Inventors: Hyeon-June Kim, Yeosu-si (KR);
Min-Kyu Kim, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/154,492

(22) Filed: Oct. 8, 2018

(65) Prior Publication Data
US 2019/0124284 A1  Apr. 25, 2019

(30) Foreign Application Priority Data
Oct. 20, 2017 (KR) .................. 10-2017-0136466

(51) Int. Cl.
| | |
|---|---|
| *H04N 5/378* | (2011.01) |
| *H04N 5/374* | (2011.01) |
| *H04N 9/04* | (2006.01) |
| *H04N 5/3745* | (2011.01) |

(52) U.S. Cl.
CPC .......... *H04N 5/378* (2013.01); *H04N 5/374* (2013.01); *H04N 9/045* (2013.01)

(58) Field of Classification Search
CPC ........ H04N 5/378; H04N 5/374; H04N 9/045; H04N 5/37455; H03M 1/12
See application file for complete search history.

(56) References Cited

U.S. PATENT DOCUMENTS

| | | | |
|---|---|---|---|
| 8,963,759 B2 * | 2/2015 | Yan .................. | H03M 1/56 341/155 |
| 9,787,927 B2 * | 10/2017 | Yoshida ............... | H03M 1/129 |
| 2014/0146210 A1 * | 5/2014 | Lee .................. | H04N 5/378 348/302 |

FOREIGN PATENT DOCUMENTS

| | | | |
|---|---|---|---|
| KR | 10-2008-0019376 | | 3/2008 |
| KR | 20080019376 A | * | 3/2008 |
| KR | 10-2013-0097989 | | 9/2013 |

* cited by examiner

*Primary Examiner* — Ahmed A Berhan
(74) *Attorney, Agent, or Firm* — Perkins Coie LLP (57) ABSTRACT

A comparison device includes an offset generation circuit that includes an input port to receive an offset control signal and is structured to generate an offset based on the received offset control signal; a comparison circuit comprising a first input port coupled to the offset generation circuit to receive a first input signal and a second input port coupled to receive a second input signal that is offset by the offset generated by the offset generation circuit and operable to compare the first input signal with the second input signal to produce a comparison signal; and a control circuit coupled to the comparison circuit to receive the comparison signal and operable to detect a crossing of the first input signal and the second input signal according to the comparison signal circuit and to output the offset control signal to the offset generation circuit.

19 Claims, 9 Drawing Sheets

SINGLE-SLOPE COMPARISON DEVICE WITH LOW-NOISE, AND ANALOG-TO-DIGITAL CONVERSION DEVICE AND CMOS IMAGE SENSOR INCLUDING THE SAME

CROSS-REFERENCE TO RELATED APPLICATION

This patent document claims the priority and benefits of Korean Patent Application No. 10-2017-0136466, filed on Oct. 20, 2017, which is incorporated herein by reference in its entirety.

TECHNICAL FIELD

The technology and implementations disclosed in this patent document relate to an analog-to-digital conversion device and a complementary metal oxide semiconductor (CMOS) image sensor.

BACKGROUND

The high-speed readout and low power consumption are important parameters to consider in designing CMOS image sensors. However, there is a trade-off between the high-speed readout and low power consumption. The demand for CMOS image sensors with more and more pixels leads to an increased bandwidth of readout circuitry in order to read out the increased number of pixels within a short frame of time. To facilitate the high-speed readout of large pixel array without consuming much power, therefore, a column-parallel architecture may be used.

In a column-parallel analog-to-digital converter (ADC) architecture of the CMOS image sensor, a single-slope ADC is often used because it can be implemented using a very simple column circuit and requires much less chip area than other types of ADC.

Recently, a multi-sampling technique has been proposed to improve a noise cancellation performance in the CMOS image sensor by sampling an input signal multiple times and analog-to-digital converting and by averaging sampled input signals.

The single-slope ADC device, however, is often accompanied with an increase in the number of clocks to sample an input signal multiple times and analog-to-digital convert the sampled input signals. For instance, a 10-bit analog-to-digital conversion requires 1024 clocks, and thus a 10-bit multi-sampling analog-to-digital conversion may require at least 2048 clocks. Such an increase in the clock cycles for processing reduces the image processing speed of the imaging device and thus is undesirable.

As an alternative to the multi-sampling technique discussed above, a multi-sampling operation can be performed by increasing a slope of a ramp signal by multiple times, e.g., ranging from ×1 to ×16, during the 1024 clocks to perform the 10-bit analog-to-digital conversion. As the slope of the ramp signal increases, however, it becomes more difficult to settle the ramp signal properly.

Since a noise performance is an important factor for maintaining a satisfactory imaging performance at a low illuminance, the ADC converter often uses different types of ramp signal generation devices including a ramp signal generation device for a low illuminance and another ramp signal generation device for a high illuminance. For example, if an input signal is within 300 least significant bit (LSB) of a whole reference value of 1024 LSB, its illuminance condition is identified as a low illuminance, and thus an analog-to-digital conversion is performed by multi-sampling the ramp signal three times with the slope of 1-300 LSB. If the input signal is over 300 LSB of the whole reference value of 1024 LSB, its illuminance condition is identified as a high illuminance, and thus an analog-to-digital conversion is performed by sampling the ramp signal with the slope of 1-1024 LSB.

Various implementations of the above-described technology, however, tend to exhibit a non-linear characteristic due to a characteristic difference between the two different ramp signal generation devices.

As a different approach, a double analog-to-digital conversions may be performed by driving two ramp signals outputted from two different ramp signal generation devices are driven through different buffers having different offset values. The two ramp signals have multiple crossings with an input signal, and the crossings occur sequentially with a predetermined delay.

However, it is difficult to guarantee a characteristic difference (e.g., a temperature variation) and an offset generation of each buffer.

SUMMARY

This patent document provides, among others, designs of image sensing devices that have a single slope comparison device that allows an input signal and a ramp signal to have multiple crossings with each other by applying an offset to the input signal, thereby acquiring a multi-sampling effect without an increase in the number of clocks, thus providing a desired processing speed and energy efficient operation of an imaging sensing device based on the disclosed technology.

In an embodiment, a comparison device may include an offset generation circuit that includes an input port to receive an offset control signal and is structured to generate an offset based on the received offset control signal; a comparison circuit comprising a first input port coupled to the offset generation circuit to receive a first input signal and a second input port coupled to receive a second input signal that is offset by the offset generated by the offset generation circuit and operable to compare the first input signal with the second input signal to produce a comparison signal; and a control circuit coupled to the comparison circuit to receive the comparison signal and operable to detect a crossing of the first input signal and the second input signal according to the comparison signal circuit and to output the offset control signal to the offset generation circuit.

In an embodiment, an analog-to-digital conversion device may include an offset generation circuit suitable for generating an offset according to an offset control signal; a comparison circuit suitable for comparing a first input signal with a second input signal to which the offset has been applied and outputting a comparison signal; a control circuit suitable for detecting a crossing of the first input signal and the second input signal according to the comparison signal outputted from the comparison circuit and outputting the offset control signal to the offset generation circuit; and a counter suitable for performing a counting operation based on the comparison signal outputted from the comparison circuit.

In an embodiment, a complementary metal oxide semiconductor (CMOS) image sensor may include a pixel array comprising pixels arranged in rows and columns wherein each pixel is operable to generate a pixel signal corresponding to incident light received at each pixel; a row decoder coupled to the pixel array and operable to select and control pixels of the pixel array row by row; a ramp signal generation circuit structured to generate a ramp signal; an offset generation circuit suitable for generating an offset according to an offset control signal; a comparison circuit coupled to the ramp signal generation circuit to receive the ramp signal and operable to compare the ramp signal with a pixel signal to which the offset has been applied to output a comparison signal; a control circuit coupled to the comparison circuit to receive the comparison signal and operable to detect a crossing of the ramp signal and the pixel signal according to the comparison signal to generate the offset control signal to the offset generation circuit; a counter coupled to the comparison circuit to receive a version of the comparison signal and operable to perform a counting operation based on the comparison signal; a memory coupled to the counter and operable to store information outputted from the counter; a column read-out circuit coupled to the memory and operable to output the information stored in the memory; and a control circuit coupled to and operable to control, the row decoder, the ramp signal generation circuit, the comparison circuit, the counter, the memory and the column read-out circuit.

In an embodiment, an analog-to-digital conversion device may include a comparator including a first input terminal receiving a signal to be sampled and a second input terminal receiving a ramp signal to be compared with the signal to be sampled; a plurality of capacitors coupled in parallel, each capacitor including one electrode couplable to one of a power supply voltage and a ground voltage; a plurality of switch circuits coupled in parallel, each switch circuit being coupled to one of the plurality of capacitors to connect the one of the plurality of capacitors to the first input terminal; a control circuit to provide the plurality of switch circuits with an offset control signal when the voltage levels of the first and second input terminals become identical to each other; and a counter to output digital codes based on a voltage difference between the first and second input terminals, wherein the plurality of capacitors and the plurality of switch circuits are used as a charge pump that raises the voltage level of the first input terminal when the ramp signal has a positive slope and lowers the voltage level of the first input terminal when the ramp signal has a negative slope.

In an embodiment, a comparison device may include an offset generation block suitable for generating an offset according to an offset control signal; a comparison block suitable for comparing a first input signal with a second input signal having the offset outputted from the offset generation block and outputting a comparison signal; and a control block suitable for detecting a crossing according to the comparison signal outputted from the comparison block and outputting the offset control signal to the offset generation block.

In an embodiment, an analog-to-digital conversion device may include an offset generation block suitable for generating an offset according to an offset control signal; a comparison block suitable for comparing a first input signal with a second input signal having the offset outputted from the offset generation block and outputting a comparison signal; a control block suitable for detecting a crossing according to the comparison signal outputted from the comparison block and outputting the offset control signal to the offset generation block; and an averaging counter suitable for performing a counting operation and averaging a counting value the counting according to the comparison signal outputted from the comparison block.

In an embodiment, a complementary metal oxide semiconductor (CMOS) image sensor may include a pixel array suitable for outputting a pixel signal corresponding to an incident light; a row decoder suitable for selecting and controlling pixels of the pixel array row by row; a ramp signal generation unit suitable for generating a ramp signal; an offset generation block suitable for generating an offset according to an offset control signal; a comparison block suitable for comparing the ramp signal outputted from ramp signal generation unit with a pixel signal having the offset outputted from the offset generation block, and outputting a comparison signal; a control block suitable for detecting a crossing according to the comparison signal outputted from the comparison block, and outputting the offset control signal to the offset generation block; an averaging counter suitable for performing a counting operation and averaging a counting value according to the comparison signal outputted from the comparison block; a memory suitable for storing a counting information outputted from the averaging counter; a column read-out circuit suitable for outputting stored data of the memory; and a control unit suitable for controlling operations of the row decoder, the ramp signal generation unit, the comparison block, the averaging counter, the memory and the column read-out circuit.

In an embodiment, a complementary metal oxide semiconductor (CMOS) image sensor may include a pixel array suitable for outputting a pixel signal corresponding to an incident light; a row decoder suitable for selecting and controlling pixels of the pixel array row by row; a ramp signal generation unit suitable for generating a ramp signal; an offset generation block suitable for generating an offset according to an offset control signal; a comparison block suitable for comparing the pixel signal with the ramp signal having the offset outputted from the offset generation block, and outputting a comparison signal; a control block suitable for detecting a crossing according to the comparison signal outputted from the comparison block, and outputting the offset control signal to the offset generation block; an averaging counter suitable for performing a counting operation and averaging a counting value according to the comparison signal outputted from the comparison block; a memory suitable for storing a counting information outputted from the averaging counter; a column read-out circuit suitable for outputting stored data of the memory; and a control unit suitable for controlling operations of the row decoder, the ramp signal generation unit, the comparison block, the averaging counter, the memory and the column read-out circuit.

DETAILED DESCRIPTION

Figure 1:
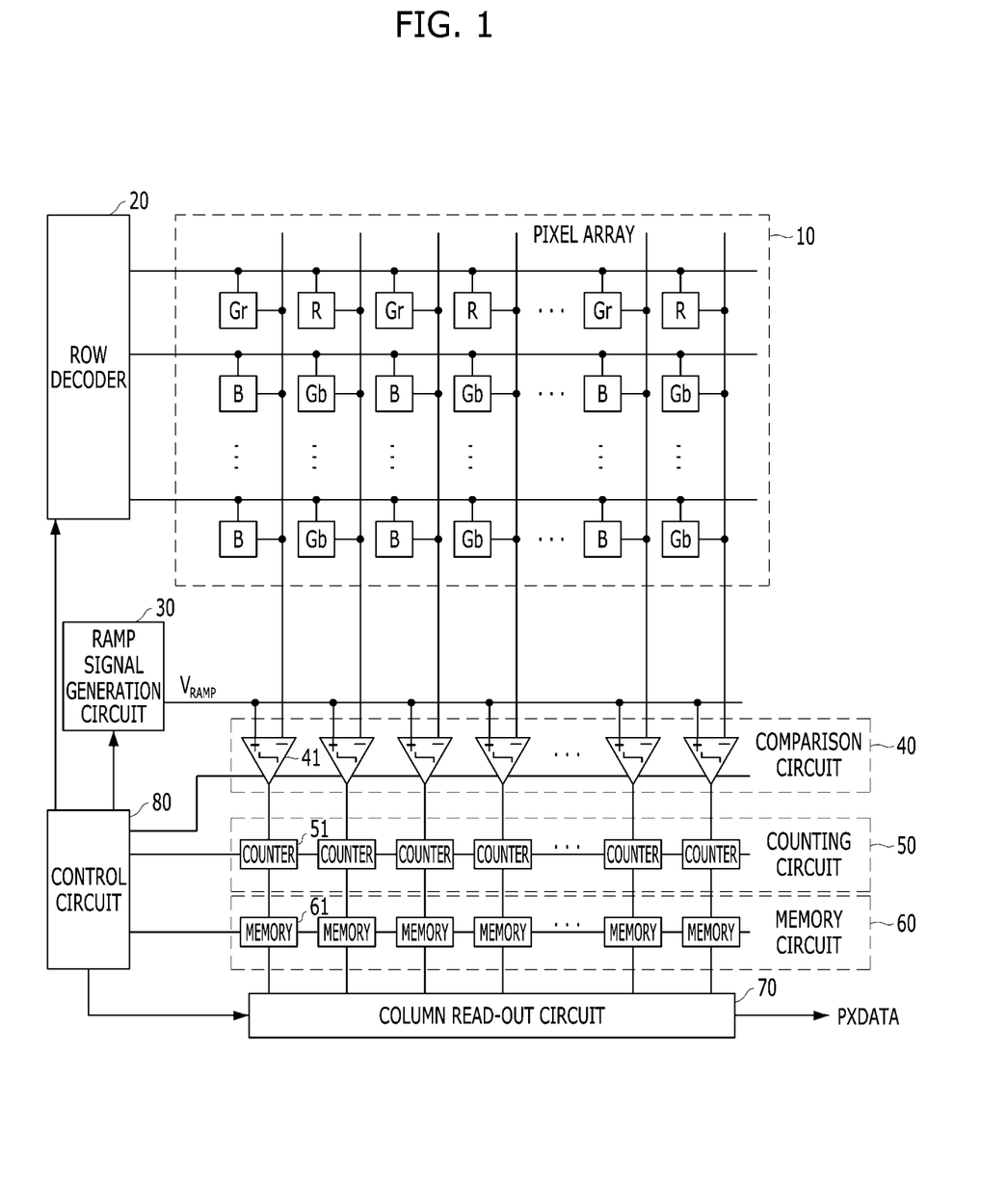
FIG. 1 is a diagram illustrating an example of a CMOS image sensor.

FIG. 1 is a diagram illustrating an example of a CMOS image sensor. The CMOS image sensor shown in FIG. 1 represents a CMOS image sensor of column parallel structure using a single-slope analog-to-digital conversion device.

Referring to FIG. 1, the CMOS image sensor includes a pixel array 10 of imaging pixels arranged in rows and columns, a row decoder 20, a ramp signal generation circuit 30, a comparison circuit 40, a counting circuit 50, a memory circuit 60, a column read-out circuit 70 and a control circuit 80. The specific example in FIG. 1 shows a pixel arrangement of colored imaging pixels labeled as "R" for a red colored pixel, "G" for a green colored pixel, "B" for a blue colored pixel, and "Gr" and "Gb" for pixels based on the well-known Bayer pattern which has 50% green pixels, 25% red pixels, and 25% blue pixels.

The pixel array 10 outputs pixel signals in response to incident light at individual imaging pixels. The row decoder 20 selects and controls pixels of the pixel array row by row.

The ramp signal generation circuit 30 generates a ramp signal $V_{RAMP}$ in response to a control signal of the control circuit. The comparison circuit 40 compares the ramp signal $V_{RAMP}$ of the ramp signal generation circuit 40 with each pixel signal outputted from the pixel array.

The counting circuit 50 counts the number of clock pulses of the control circuit 80 according to output signals of the comparison circuit 40. The memory circuit 60 stores information (e.g., the number of clock pulses) provided by the counting circuit 50 according to instructions provided by the control circuit 80. The column read-out circuit 70 outputs sequentially the information stored in the memory circuit 60 as a pixel data PXDATA according to instructions provided by the control circuit 80. The control circuit 80 controls operations of the row decoder 20, the ramp signal generation circuit 30, the comparison circuit 40, the counting circuit 50, the memory circuit 60 and the column read-out circuit 70.

A CMOS image sensor may include the comparison circuit 40 that utilizes a correlated double sampling CDS technique to remove an offset value of the pixel.

The comparison circuit 40 includes a plurality of comparators 41, the counting circuit 50 includes a plurality of counters 51, and the memory circuit 60 includes a plurality of memories 61. In an example configuration, each column of the pixel array 10 includes the comparator 41, the counter 51 and the memory 61.

The operations of the comparator 41, the counter 51 and the memory 61 will be described with reference to FIG. 1 as below.

The comparator 41 has two input terminals that receive a pixel signal outputted from a column of the pixel array 10 a ramp signal $V_{RAMP}$ outputted from the ramp signal generation circuit 30, respectively. The comparator 41 compares the ramp signal $V_{RAMP}$ with the pixel signal and outputs a comparison signal in response to a control signal provided by the control circuit 80.

Since a voltage level of the ramp signal $V_{RAMP}$ increases or decreases as time passes, the ramp signal $V_{RAMP}$ crosses the pixel signal at some point in time. After this crossing point, the value of the comparison signal outputted from the comparator 41 is inverted.

The counter 51 is used to count pulses during a period of time, for example, when the pixel signal is above the ramp signal. The counter 51 is initialized by a reset control signal of the control circuit 80.

The memory 61 stores information relating to the count (e.g., number of pulses) provided by the counter 51 and outputs the information to the column read-out circuit 70 according to control signals of the control circuit 80. Here, the CMOS image sensor may perform a counting operation on a reset signal (or a reset voltage) and then perform a counting operation on an image signal (a signal voltage).

Figure 2A:
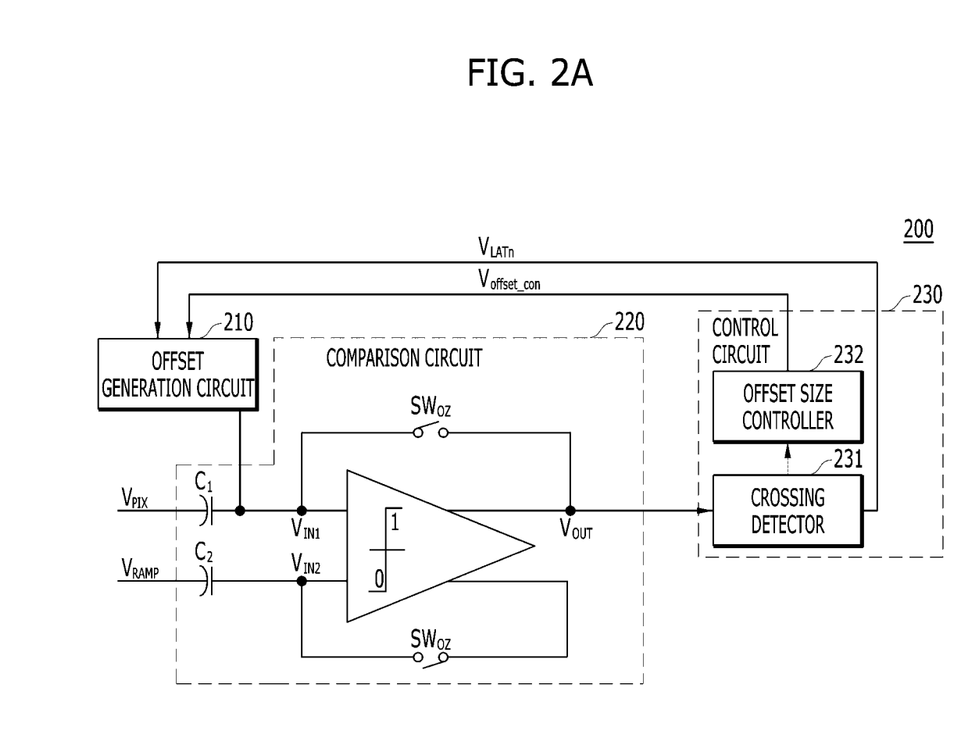
FIG. 2A is a diagram illustrating an example of a comparison device in accordance with an embodiment of the disclosed technology.

FIG. 2A is a diagram illustrating an example of a comparison device in accordance with an embodiment of the disclosed technology.

Referring to FIG. 2A, a comparison device 200 in accordance with an embodiment of the disclosed technology includes an offset generation circuit 210, a comparison circuit 220 and a control circuit 230.

The offset generation circuit 210 is a circuit that generates an offset (e.g., an offset voltage) in response to an offset control signal from the control circuit to apply the offset to a pixel signal to produce a modified pixel signal. The comparison circuit 220 is a comparator circuit that is coupled to receive the modified pixel signal from the offset generation circuit 210 and compares a ramp signal $V_{RAMP}$ with the modified pixel signal which is increased or decreased in magnitude by the offset, and outputs a comparison signal indicating the comparison result. The control circuit 230 is coupled to both the comparison circuit 220 and the offset generation circuit 210 and detects a crossing of the ramp signal $V_{RAMP}$ and the modified pixel signal to which the offset has been applied based on the comparison signal outputted from the comparison circuit 220, and outputs the offset control signal, e.g., an offset generation control signal and an offset size control signal, to the offset generation circuit 210.

More specifically, when an analog-to-digital conversion is performed on a row of the pixel array, the comparison circuit 220 compares a pixel signal $V_{PIX}$ with the ramp signal $V_{RAMP}$ and outputs a first comparison signal at first, and then compares the ramp signal $V_{RAMP}$ with the pixel signal to which an offset voltage has been applied, and outputs a second comparison signal, and then compares the ramp signal $V_{RAMP}$ with the pixel signal to which another offset voltage has been applied, and outputs a third comparison signal. In this way, the comparison circuit 220 may repeatedly perform sampling processes multiple times while repeatedly applying the offset to the pixel signal. Here, the offset voltage is generated by the offset generation circuit

210. In an implementation of the disclosed technology, the comparison circuit 220 linearly changes the voltage level of the pixel signal by the offset voltage and feeds the linearly changing pixel signal to the node of the first input voltage $V_{IN1}$. For example, if the ramp signal $V_{RAMP}$ has a positive slope, the comparison circuit 220 increases the voltage level of the pixel signal by the offset voltage, and if the ramp signal $V_{RAMP}$ has a negative slope, the comparison circuit 220 decreases the voltage level of the pixel signal by the offset voltage.

As shown in FIG. 2A, the comparison circuit 220 may, in one example implementation, include a single comparison circuit. Alternatively, the comparison circuit 220 may include a plurality of comparison circuits. The comparison circuit 220 may include a first capacitor $C_1$, a second capacitor $C_2$, two switches $SW_{OZ}$ and a comparator such as an op-amp comparator.

The control circuit 230 includes a crossing detector 231, an offset size controller 232.

The crossing detector 231 detects a crossing of the ramp signal $V_{RAMP}$ and the pixel signal based on the comparison signal outputted from the comparison circuit 220, and outputs the offset generation control signal to the offset generation circuit 210. The offset size controller 232 outputs the offset size control signal to the offset generation circuit 210. Here, the offset size control signal may be generated based on the crossing detection result outputted from the crossing detector 231.

Alternatively, the offset size controller 232 may be implemented to generate the offset size control signal based on a control signal provided by a control circuit such as a timing generator (not shown in the drawings).

Figure 2B:
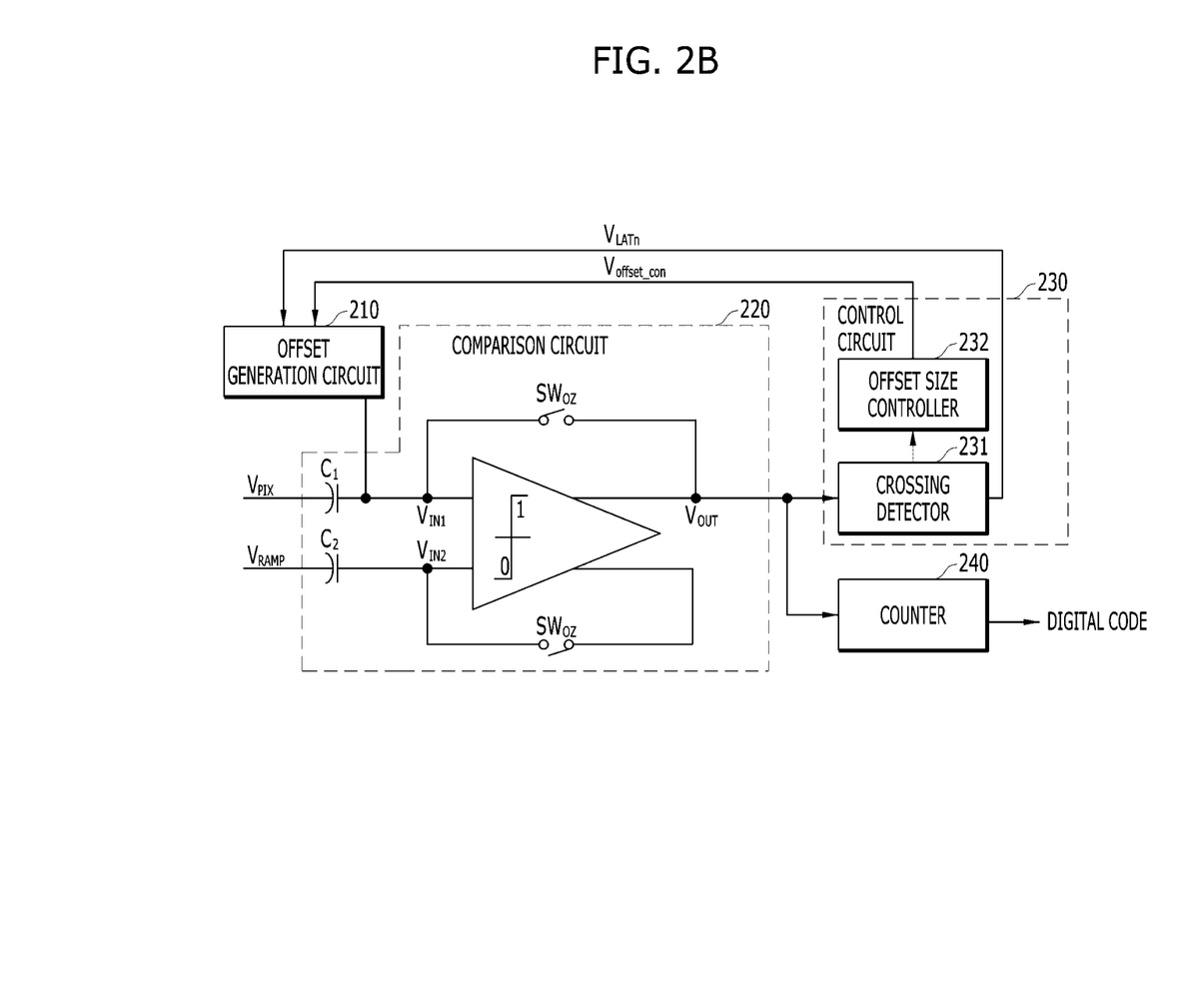
FIG. 2B is a diagram illustrating an example of an analog-to-digital conversion device including the comparison device shown in FIG. 2A in accordance with an embodiment of the disclosed technology.

FIG. 2B is a diagram illustrating an example of an analog-to-digital conversion device including the comparison device shown in FIG. 2A in accordance with an embodiment of the disclosed technology.

Referring to FIG. 2B, an analog-to-digital conversion device in accordance with an embodiment of the disclosed technology includes an offset generation circuit 210, a comparison circuit 220, a control circuit 230 and a counter 240.

Since the offset generation circuit 210, the comparison circuit 220 and the control circuit 230 shown in FIG. 2B may be implemented in the same way as the offset generation circuit 210, the comparison circuit 220 and the control circuit 230 shown in FIG. 2A, the detailed descriptions of the offset generation circuit 210, the comparison circuit 220 and the control circuit 230 will be omitted.

The counter 240 counts the number of pulses of a clock signal outputted from a control circuit 80 of FIG. 1 according to the comparison signal outputted from the comparison circuit 220.

In an example implementation of the disclosed technology, the counter 240 may be an averaging counter that performs counting and averaging on the comparison signal.

Figure 2C:
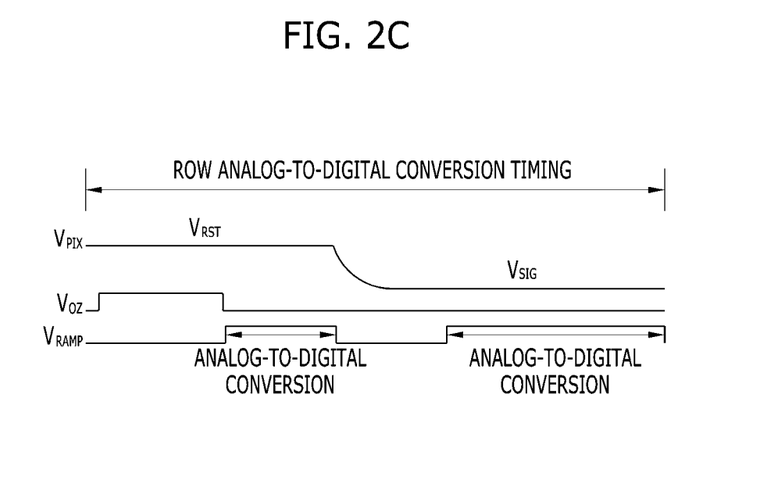
FIG. 2C is a timing diagram illustrating an analog-to-digital conversion of the comparison device shown in FIG. 2A and the analog-to-digital conversion device shown in FIG. 2B.

FIG. 2C is a timing diagram illustrating an analog-to-digital conversion of the comparison device shown in FIG. 2A and the analog-to-digital conversion device shown in FIG. 2B. For example, the analog-to-digital conversion showing in FIG. 2C may be an analog-to-digital conversion performed on a row of the pixel array.

The pixel signal $V_{PIX}$ is a signal read out from a pixel. In performing the analog-to-digital conversion, a correlated double sampling (CDS) is often used to eliminate some unwanted noise. In the CDS, a reset signal $V_{RST}$ is read out first, and then a signal voltage $V_{SIG}$ is read out.

The comparison device 200 acquires a difference value ($|V_{RST}-V_{SIG}|$) between the reset signal $V_{RST}$ and the signal voltage $V_{SIG}$ through the CDS operation and determines the acquired difference value as the value of the pixel signal.

The analog-to-digital conversion device converts the determined analog pixel signal to a digital value. The CDS operation is often called an analog CDS operation.

The CDS operation includes two set of sampling and holding that are sequentially performed. The reset voltage $V_{RST}$ is sampled and held in the first capacitor $C_1$, and then the signal voltage $V_{SIG}$ is sampled and held in the first capacitor $C_1$. Subsequently, the analog-to-digital-converting operation is performed to obtain a digital code value based on an absolute value of the reset signal $V_{RST}$, and to obtain a digital code value based on the difference value ($|V_{RST}-V_{SIG}|$) between the reset signal $V_{RST}$ and the signal voltage $V_{SIG}$. Thus, an analog-to-digital conversion efficiency may be improved by removing unwanted offset, which is caused by the analog-to-digital conversion, through the above-described CDS operation.

More specifically, referring to FIGS. 2B and 2C, when the reset voltage $V_{RST}$ is read out from the pixel, the two switches $SW_{OZ}$ are switched on according to the control signal of the control circuit (not shown), and a reset voltage value is sampled and held in the first capacitor $C_1$. A voltage at a first input voltage node $V_{IN1}$ becomes $-(V_{RST}-V_{CO})$, and a voltage at a second input voltage node $V_{IN2}$ becomes $V_{CO}$, where $V_{CO}$ denotes an offset voltage caused by circuitry in the comparator.

Subsequently, the two switches $SW_{OZ}$ are switched off and the ramp signal $V_{RAMP}$ is applied to the second input voltage node $V_{IN2}$ through the second capacitor $C_2$, and then the comparator compares the first input voltage $V_{IN1}$ with the second input voltage $V_{IN2}$, and outputs the comparison result. The analog-to-digital conversion for the reset voltage $V_{RST}$ is performed according to the comparison signal.

Next, the signal voltage $V_{SIG}$ of the pixel signal is applied to the comparator through the first capacitor $C_1$, and a voltage at the first input voltage node $V_{IN1}$ becomes $V_{SIG}-V_{RST}+V_{CO}$ and a voltage at the second input voltage node $V_{IN2}$ becomes $V_{CO}$. The voltage difference between the first input voltage node $V_{IN1}$ and the second input voltage node $V_{IN2}$ becomes $V_{SIG}-V_{RST}$, and the analog CDS operation may be performed through the above-described process.

Subsequently, by performing analog-to-digital-conversion on the difference value ($|V_{RST}-V_{SIG}|$) between the reset voltage $V_{RST}$ and the signal voltage $V_{SIG}$, a corresponding digital code value is acquired, and by subtracting the analog-to-digital conversion code value of the reset voltage $V_{RST}$, the digital CDS operation is performed. Thus, analog-to-digital conversion performance may be improved through the above-described process.

Figure 2D:
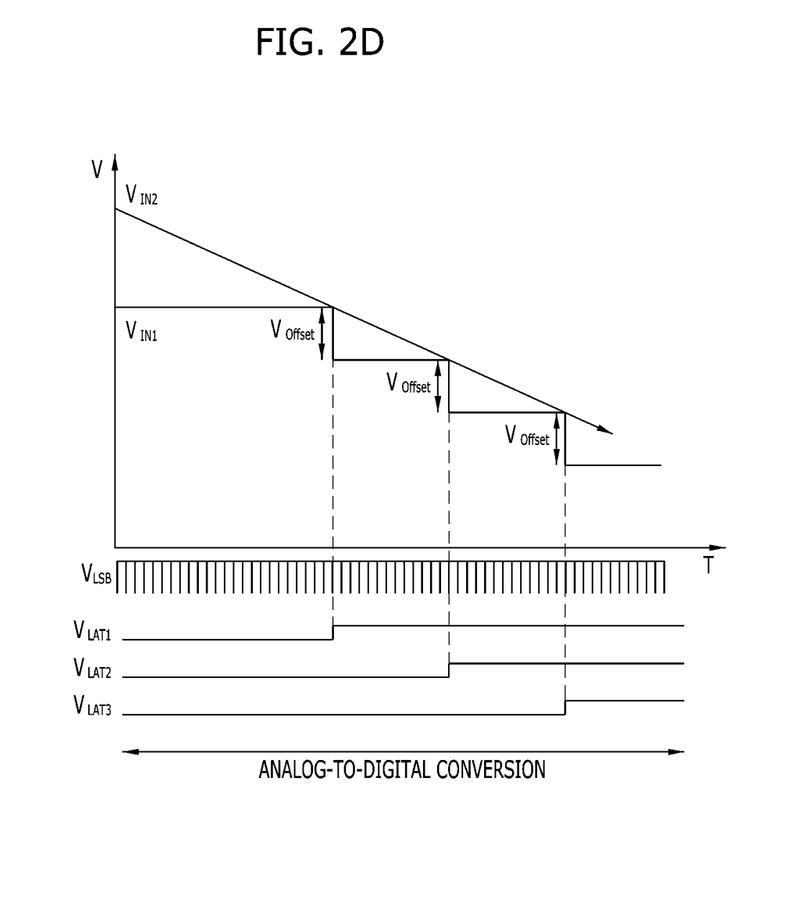
FIG. 2D is a timing diagram illustrating a crossing timing of a ramp signal and a pixel signal at the comparison device shown in FIG. 2A and the analog-to-digital conversion device shown in FIG. 2B.

FIG. 2D is a timing diagram illustrating a crossing timing of the ramp signal $V_{RAMP}$ and the pixel signal at the comparison device shown in FIG. 2A and the analog-to-digital conversion device shown in FIG. 2B. More specifically, FIG. 2D shows signal shapes of the pixel signal to which offset voltages have been applied and the crossing timing of the first input voltage $V_{IN1}$ and the second input voltage $V_{IN2}$.

The analog-to-digital conversion device operates according to a timing signal $V_{LSB}$ and the offset generation control signals $V_{LAT1}, V_{LAT2}, V_{LAT3} \ldots V_{LATn}$ during an analog-to-digital conversion period. Here, the timing signal $V_{LSB}$ may include information relating to a timing when the ramp signal generation device increases the ramp signal by the offset voltage and applies the ramp signal to the comparator.

The offset generation control signal $V_{LATn}$ may include information relating to an operation timing when the offset is applied to the first input voltage $V_{IN1}$ by the offset generation circuit 210 in response to the offset generation control signal, which is generated by the crossing detector 231 when the first input voltage $V_{IN1}$ and the second input voltage $V_{IN2}$ become identical to each other (crossing). Here, the "n" of $V_{LATn}$ denotes the number of crossing of the first input voltage $V_{IN1}$ and the second input voltage $V_{IN2}$, where "n" is a natural number.

More specifically, referring to FIG. 2D, when a crossing of the first input voltage $V_{IN1}$ and the second input voltage $V_{IN2}$ occurs at the comparator, the crossing detector 231 detects the crossing and sends the offset generation control signal to the offset generation circuit 210. Thus, the offset generation circuit 210 generates and applies the offset to the node of the first input voltage $V_{IN1}$. As shown in FIG. 2D, the first input voltage $V_{IN1}$ is decreased by the applied offset. Thus, the crossing of the first input voltage $V_{IN1}$ and the second input voltage $V_{IN2}$ occurs multiple times.

By repeatedly performing the above-described process multi times, the analog-to-digital conversion codes may be acquired multi times. The analog-to-digital conversion codes are averaged by the counter 240 for noise averaging purposes, and averaged analog-to-digital conversion codes are provided to a memory. Also, since it is important for the pixel signal to remove a noise at a low illuminance, various embodiments of the disclosed technology are especially beneficial in removing unwanted noise in the low illuminance condition, and a noise removing performance of the disclosed analog-to-digital conversion may be improved by employing the multi-sampling effect through the crossing of the comparator of the multi times without increasing an operation time and a power consumption.

Figure 3A:
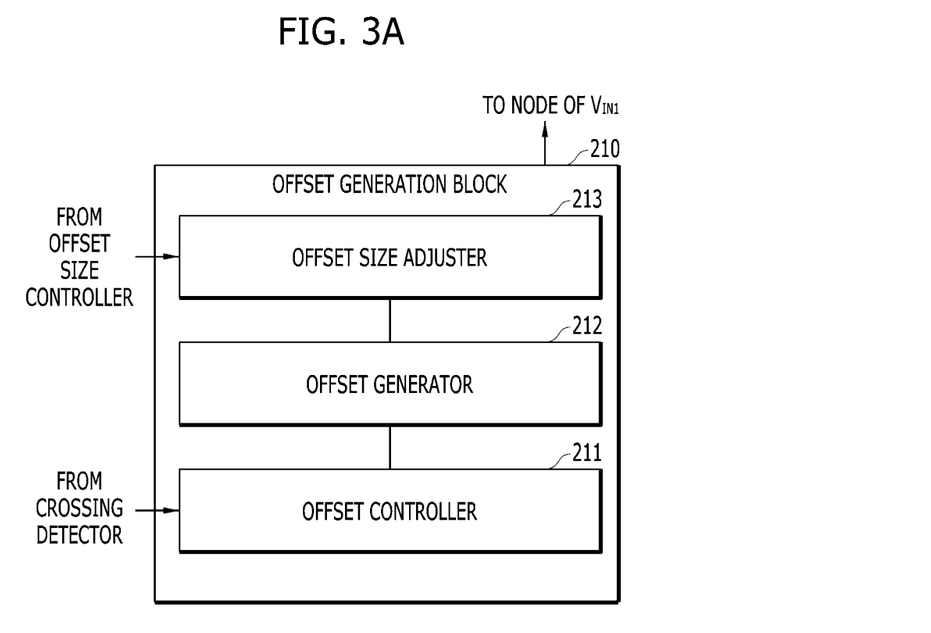
FIG. 3A is a diagram illustrating an example of the offset generation circuit shown in FIGS. 2A and 2B.
Figure 3B:
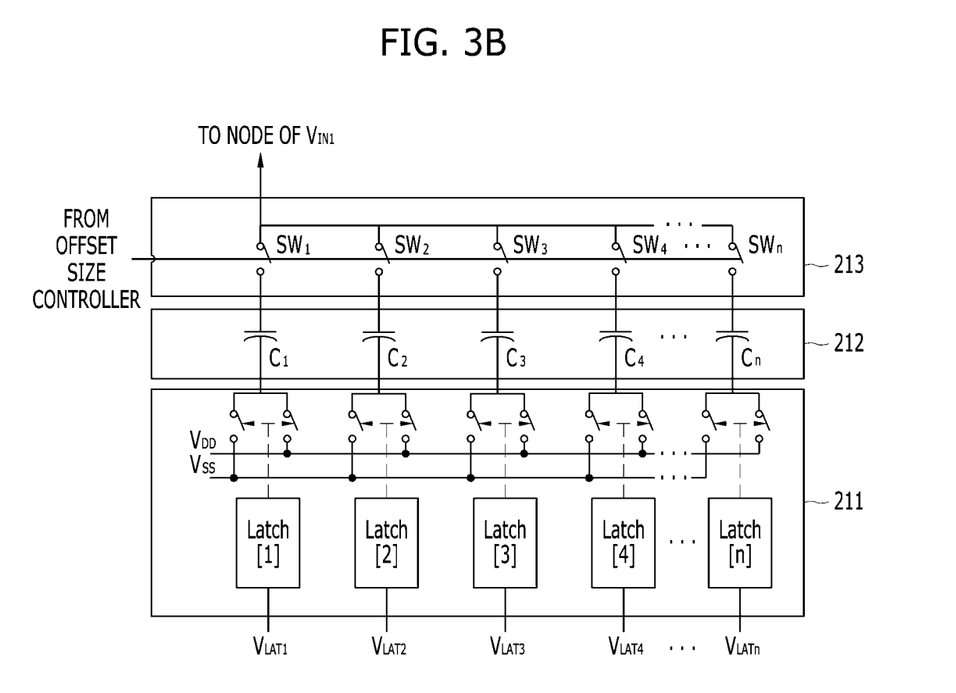
FIG. 3B is a diagram illustrating an example of the offset generation circuit shown in FIG. 3A.

FIG. 3A is a diagram illustrating an example of the offset generation circuit shown in FIGS. 2A and 2B. FIG. 3B is a diagram illustrating an example of the offset generation circuit shown in FIG. 3A.

Referring to FIG. 3A, the offset generation circuit 210 includes an offset size adjuster 213, an offset generator 212, and an offset controller 211.

The offset size adjuster 213 adjusts an offset size according to the offset size control signal outputted from the offset size controller 232 of FIGS. 2A and 2B. The offset generator 212 generates the offset of which the size is adjusted by the offset size adjuster 213. The offset controller 211 controls the generation of the offset (e.g., offset application timing) according to the offset generation control signal outputted from the crossing detector 231 of the control circuit 230 of FIGS. 2A and 2B.

More specifically, referring to FIG. 3B, the offset size adjuster 213 may be implemented using a plurality of switches $SW_1$ to $SW_n$. The size of the offset voltage is determined by the number of connected switches. For example, if a first switch $SW_1$, a second switch $SW_2$ and a third switch $SW_3$ are switched on, a first capacitor $C_1$, a second capacitor $C_2$ and a third capacitor $C_3$ included in the offset generator 212 are operated. In this scenario, a voltage range between a power supply voltage $V_{DD}$ and a ground voltage $V_{SS}$ is divided into three sub-ranges to generate the offset voltage.

If the first switch $SW_1$, the second switch $SW_2$, the third switch $SW_3$ and a fourth switch $SW_4$ are switched on, the first capacitor $C_1$, the second capacitor $C_2$, the third capacitor $C_3$ and a fourth capacitor $C_4$ included in the offset generator 212 are operated. In this scenario, the voltage range between the power supply voltage $V_{DD}$ and the ground voltage $V_{SS}$ is divided into four sub-ranges to generate the offset voltage.

Here, the offset controller 211 may include a plurality of latches Latch [1] to Latch [n] for receiving the offset generation control signal from the crossing detector 231 of FIGS. 2A and 2B, and a plurality of switches for switching between the power supply voltage $V_{DD}$ and the ground voltage $V_{SS}$ according to the output signals of the plurality of latches Latch [1] to Latch [n]. The power supply voltage $V_{DD}$ and the ground voltage $V_{SS}$ may be adjusted by an external control circuit (not shown). The size of the offset voltage may be adjusted according to the control signals of the offset controller 211. The plurality of latches Latch [1] to Latch [n] operate according to the latch signals $V_{LAT1}$ to $V_{LATn}$. The number of the plurality of latches Latch [1] to Latch [n] correspond to the number of available offset (i.e., the number of the crossing of the ramp signal and the pixel signal at the comparator). The size of the offset and the number of available offset may be selectively adjusted.

An analog-to-digital conversion device implemented based on the disclosed technology may include a comparator including a first input terminal receiving a signal to be sampled and a second input terminal receiving a ramp signal to be compared with the signal to be sampled, a plurality of capacitors coupled in parallel, each capacitor including one electrode couplable to one of a power supply voltage and a ground voltage, a plurality of switch circuits coupled in parallel, each switch circuit being coupled to one of the plurality of capacitors to connect the one of the plurality of capacitors to the first input terminal, a control circuit to provide the plurality of switch circuits with an offset control signal when the voltage levels of the first and second input terminals become identical to each other, and a counter to output digital codes based on a voltage difference between the first and second input terminals. Here, the plurality of capacitors and the plurality of switch circuits are used as a charge pump that raises the voltage level of the first input terminal when the ramp signal has a positive slope and lowers the voltage level of the first input terminal when the ramp signal has a negative slope.

Figure 4A:
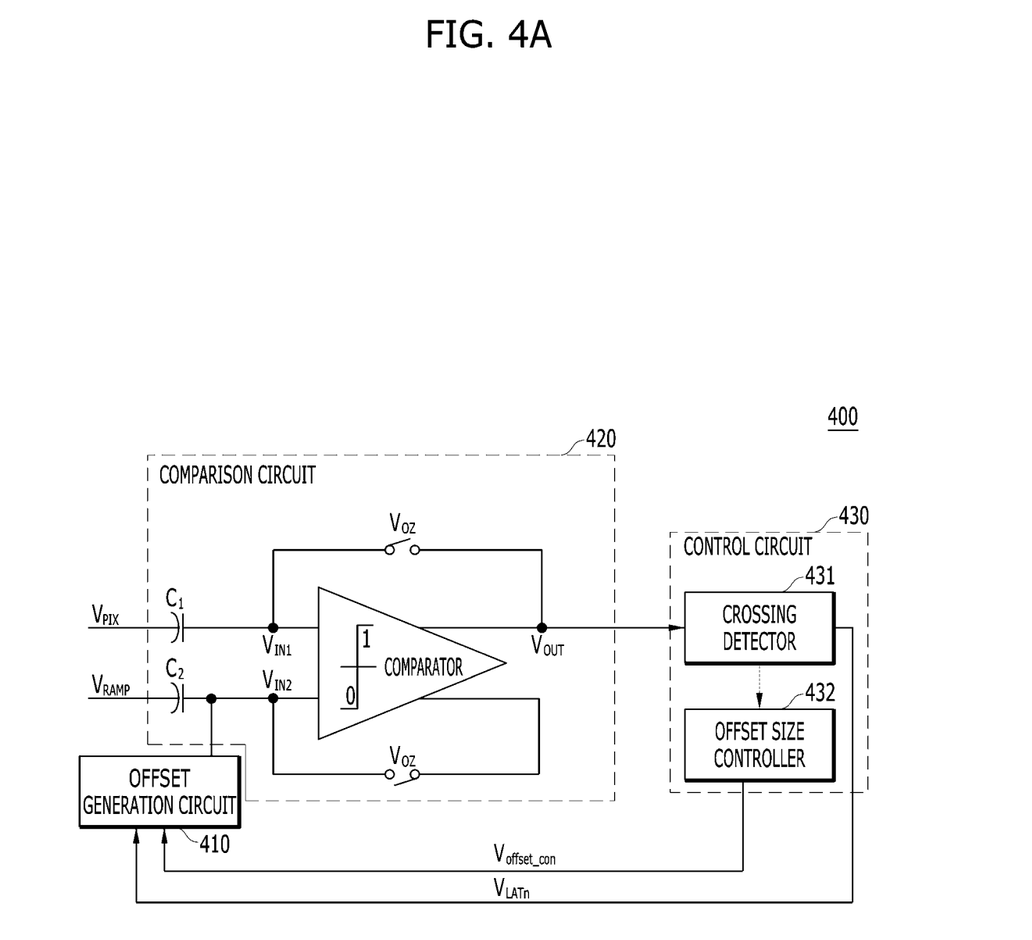
FIG. 4A is a diagram illustrating an example of a comparison device in accordance with another embodiment of the disclosed technology.

FIG. 4A is a diagram illustrating an example of a comparison device in accordance with another embodiment of the disclosed technology.

Referring to FIG. 4A, the comparison device 400 in accordance with another embodiment of the disclosed technology includes an offset generation circuit 410, a comparison circuit 420 and a control circuit 430.

The offset generation circuit 410 generates an offset in response to an offset control signal to apply the offset to a pixel signal. The comparison circuit 420 compares a pixel signal $V_{PIX}$ with a ramp signal to which the offset has been applied, and outputs a comparison signal. The control circuit 430 detects a crossing of the pixel signal $V_{PIX}$ and a ramp signal according to the comparison signal outputted from the comparison circuit 420, and outputs the offset control signal, e.g., an offset generation control signal and an offset size control signal, to the offset generation circuit 410.

More specifically, when an analog-to-digital conversion is performed on a row of the pixel array, the comparison circuit 420 compares a pixel signal $V_{PIX}$ with the ramp signal $V_{RAMP}$ and outputs a first comparison signal at first, and then compares the pixel signal $V_{PIX}$ with the ramp signal to which the offset voltage has been applied, and outputs a second comparison signal, and then compares the pixel signal $V_{PIX}$ with the ramp signal to which another offset voltage has been applied, and outputs a third comparison signal. In this way the comparison circuit 420 may repeatedly perform sampling processes multiple times while repeatedly applying the offset to the ramp signal. Here, the offset voltage is generated by the offset generation circuit 410. In an implementation of the disclosed technology, the comparison circuit 420 linearly changes the voltage level of the ramp signal by the offset voltage, and feeds the linearly changing ramp signal to the node of the second input voltage $V_{IN2}$.

In an embodiment of the disclosed technology, the comparison circuit 420 may be composed of a single comparison circuit. Alternatively, the comparison circuit 420 may include a plurality of comparison circuits. The comparison circuit 220 may include a first capacitor $C_1$, a second capacitor $C_2$, two switches $SW_{OZ}$ and a comparator such as an op-amp comparator.

The control circuit 430 includes a crossing detector 431, an offset size controller 432.

The crossing detector 431 detects a crossing of the ramp signal $V_{RAMP}$ and the pixel signal $V_{PIX}$ based on the comparison signal outputted from the comparison circuit 420, and outputs the offset generation control signal to the offset generation circuit 410. The offset size controller 432 outputs the offset size control signal to the offset generation circuit 410 Here, the offset size control signal may be generated based on the crossing detection result outputted from the crossing detector 431.

Alternatively, the offset size controller 432 may be implemented to generate the offset size control signal based on a control signal provided by the control circuit such as a timing generator (not shown in the drawings).

In an embodiment of the disclosed technology, the offset generation circuit 410 may be implemented in the same way as the offset generation circuit 210 shown in FIGS. 3A and 3B except that the offset is applied to the node of the second input voltage $V_{IN2}$.

Figure 4B:
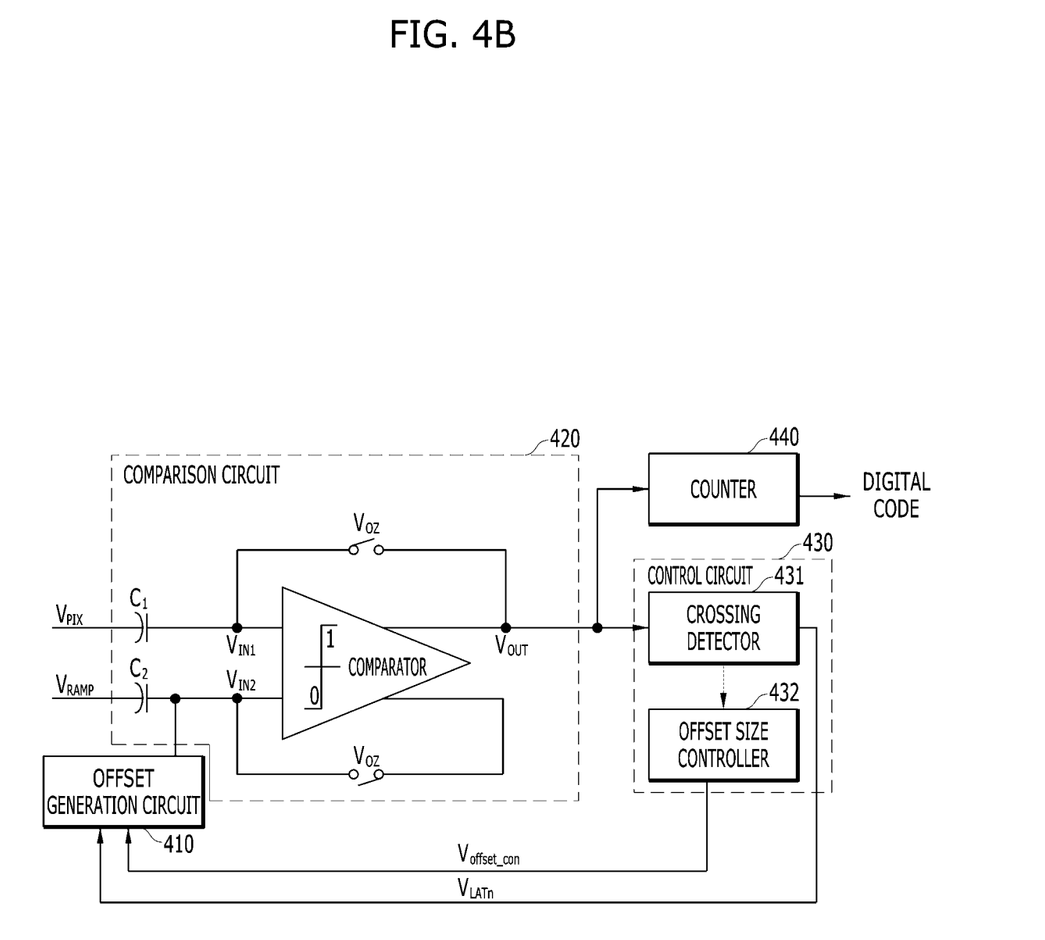
FIG. 4B is a diagram illustrating an example of an analog-to-digital conversion device including the comparison device shown in FIG. 4A in accordance with another embodiment of the disclosed technology.

FIG. 4B is a diagram illustrating an example of an analog-to-digital conversion device including the comparison device shown in FIG. 4A in accordance with another embodiment of the disclosed technology.

Referring to FIG. 4B, an analog-to-digital conversion device in accordance with another embodiment of the disclosed technology includes an offset generation circuit 410, a comparison circuit 420, a control circuit 430 and a counter 440.

Since the offset generation circuit 410, the comparison circuit 420 and the control circuit 430 shown in FIG. 4B may be implemented in the same way as the offset generation circuit 410, the comparison circuit 420 and the control circuit 430 shown in FIG. 4A, the detailed descriptions of the offset generation circuit 410, the comparison circuit 420 and the control circuit 430 will be omitted.

The counter 440 counts the number of pulses of a clock signal outputted from a control circuit 80 of FIG. 1 according to the comparison signal outputted from the comparison circuit 420.

In an example implementation of the disclosed technology, the counter 440 may be an averaging counter that performs counting and averaging on the comparison signal.

Figure 4C:
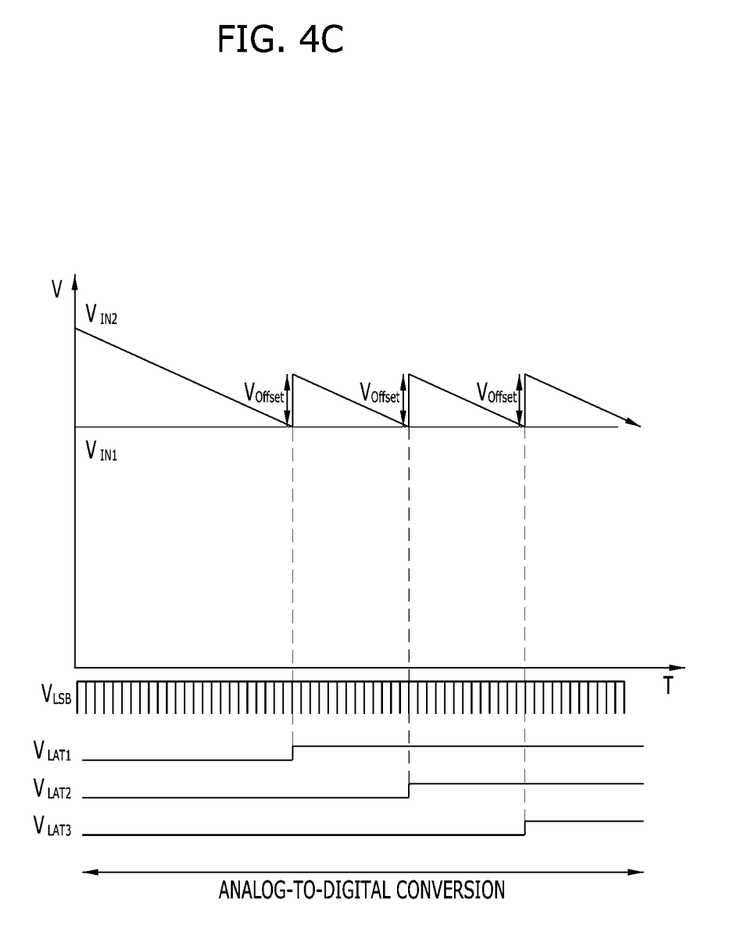
FIG. 4C is a timing diagram illustrating a crossing timing of the comparison device shown in FIG. 4A and the analog-to-digital conversion device shown in FIG. 4B.

FIG. 4C is a timing diagram illustrating a crossing timing of the ramp signal $V_{RAMP}$ and the pixel signal $V_{PIX}$ at the comparison device shown in FIG. 4A and the analog-to-digital conversion device shown in FIG. 4B. More specifically, FIG. 4C shows signal shapes of the ramp signal $V_{RAMP}$ to which offset voltages have been applied and the crossing timing of the first input voltage $V_{IN1}$ and the second input voltage $V_{IN2}$.

The timing diagram shown in FIG. 4C is similar to the timing diagram shown in FIG. 2D except the signal variation shapes of the first input voltage $V_{IN1}$ and the second input voltage $V_{IN2}$.

Since the crossing timing of the first input voltage $V_{IN1}$ and the second input voltage $V_{IN2}$ shown in FIG. 4C is similar to the crossing timing of the first input voltage $V_{IN1}$ and the second input voltage $V_{IN2}$ shown in FIG. 2D, the detailed descriptions of the crossing timing of the first input voltage $V_{IN1}$ and the second input voltage $V_{IN2}$ will be omitted.

Referring to FIG. 4C, the first input voltage $V_{IN1}$ has a constant voltage, and a waveform of the second input voltage $V_{IN2}$, which is the same as the ramp signal $V_{RAMP}$, is adjusted by the offset voltage outputted from the offset generation circuit 410.

In another embodiment of the disclosed technology, a redundancy may be added to reduce a gain error that may occur by adding a capacitor to an input terminal. Here, the redundancy may be added by setting mismatched value as an offset value and removing the set mismatched value after the operation is performed. Also, this gain error may be removed by adding a dummy capacitance having the same size as the added capacitance to different input terminals.

Figure 5:
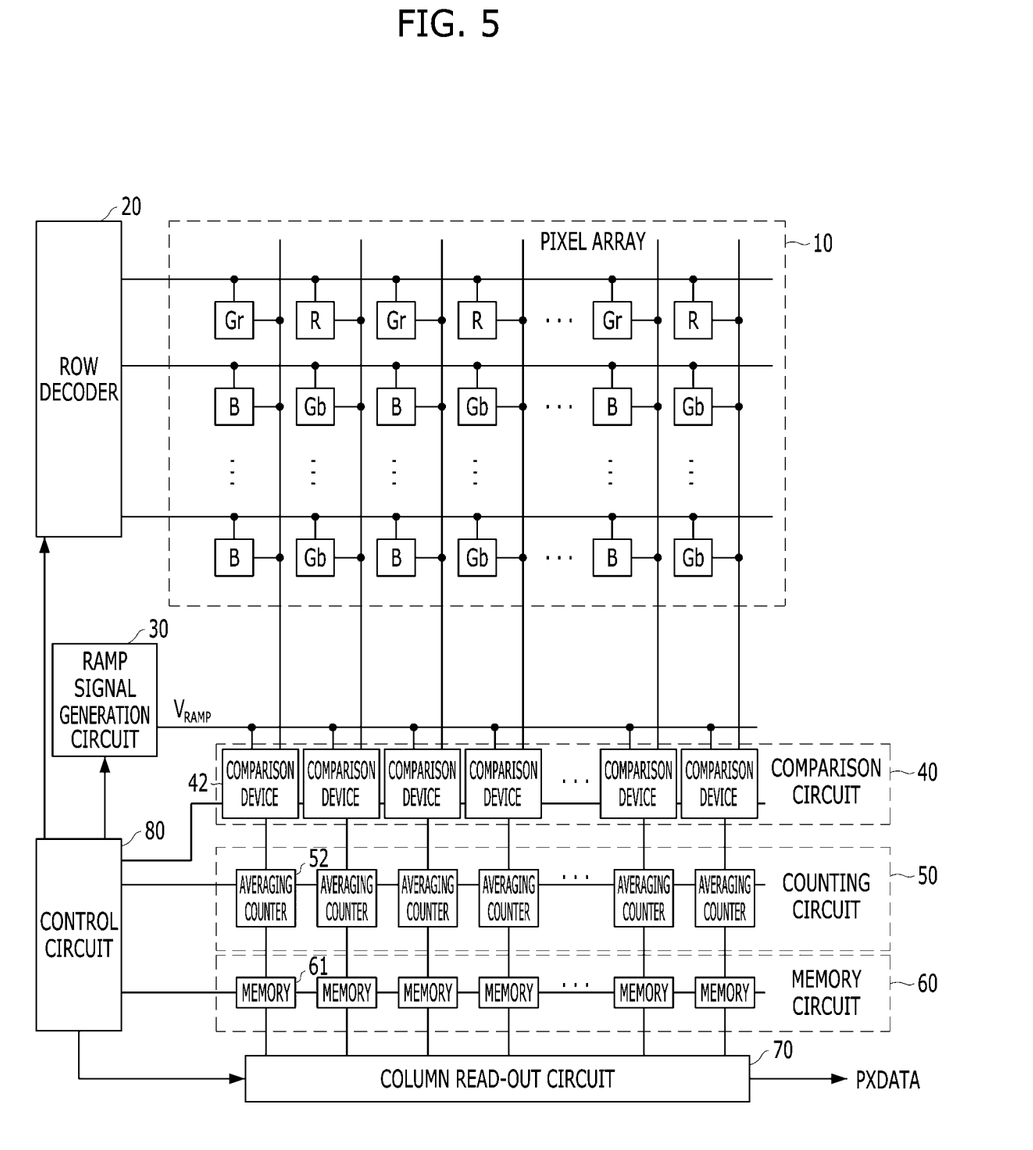
FIG. 5 is a diagram illustrating an example of a CMOS image sensor in accordance with embodiments of the disclosed technology.

FIG. 5 is a diagram illustrating an example of a CMOS image sensor including a comparison device in accordance with embodiments of the disclosed technology.

Referring to FIG. 5, the CMOS image sensor in accordance with embodiments of the disclosed technology includes a pixel array 10, a row decoder 20, a ramp signal generation circuit 30, a comparison circuit 40, a counting circuit 50, a memory circuit 60, a column read-out circuit 70 and a control circuit 80.

The pixel array 10 outputs pixel signals corresponding to incident light. The row decoder 20 selects and controls pixels of the pixel array row by row. The ramp signal generation circuit 30 generates a ramp signal $V_{RAMP}$ (including a coarse ramping signal and a fine ramping signal) in response to a control signal of the control circuit. The comparison circuit 40 compares the ramp signal $V_{RAMP}$ of the ramp signal generation circuit 40 with each pixel signal outputted from the pixel array.

The counting circuit 50 counts the number of clock pulses of the control circuit 80 according to output signals of the comparison circuit 40. The memory circuit 60 stores information (e.g., the number of clock pulses) provided by the counting circuit 50 according to instructions provided by the control circuit 80. The column read-out circuit 70 outputs sequentially the information stored in the memory circuit 60 as a pixel data PXDATA according to instructions provided by the control circuit 80. The control circuit 80 controls operations of the row decoder 20, the ramp signal generation circuit 30, the comparison circuit 40, the counting circuit 50, the memory circuit 60 and the column read-out circuit 70.

Here, the comparison circuit 40 includes the comparison device 42, which is implemented using the comparison device 200 shown in FIG. 2A or the comparison device 400 shown in FIG. 4A in accordance with embodiments of the disclosed technology.

Also, the counting circuit 50 includes the averaging counter 52, which is implemented using the counter 240 shown in FIG. 2B or the counter 440 shown in FIG. 4B in accordance with embodiments of the disclosed technology.

The single-slope analog-to-digital conversion technique implemented based on the disclosed technology may employ a multi-sampling effect without increasing the number of clocks.

By applying offset voltages to an input signal (e.g., pixel signal or ramp signal) through a capacitor or a capacitor array, multiple crossings of the pixel signal and the ramp signal occur, and thus the single-slope analog-to-digital converter may perform multiple samplings.

Also, since it is important for the pixel signal to remove a noise at a low illuminance, various embodiments of the disclosed technology are especially beneficial in removing unwanted noise in the low illuminance condition, and a noise removing performance of the disclosed analog-to-digital conversion may be improved without increasing an operation time and a power consumption.

Although various embodiments and specific examples have been described, various changes and modifications may be made based on what is described and illustrated.

What is claimed is:

1. A comparison device, comprising:
   an offset generation circuit that includes an input port to receive an offset control signal and is structured to generate an offset based on the received offset control signal;
   a comparison circuit comprising a first input port coupled to the offset generation circuit to receive a first input signal and a second input port coupled to receive a second input signal that is offset by the offset generated by the offset generation circuit and operable to compare the first input signal with the second input signal to produce a comparison signal; and
   a control circuit coupled to the comparison circuit to receive the comparison signal and operable to detect a crossing of the first input signal and the second input signal according to the comparison signal circuit and to output the offset control signal to the offset generation circuit.

2. The comparison device of claim 1, wherein the comparison circuit repeatedly performs a comparison process multiple times during an analog-to-digital conversion, the comparison process comparing the first input signal with a third input signal and outputting the comparison signal at an initial time, the comparison process, after the initial time, comparing the first input signal with the second input signal to which the offset has been applied and outputting the comparison signal.

3. The comparison device of claim 2, wherein the second input signal is generated by decreasing or increasing the third input signal by the offset outputted from the offset generation circuit.

4. The comparison device of claim 1, wherein the control circuit includes:
   a crossing detector structured to detect the crossing of the first input signal and the second input signal according to the comparison signal of the comparison circuit to produce an output indicating a detection result of the crossing and to output the offset control signal to the offset generation circuit; and
   an offset size controller coupled to the crossing detector to receive the output thereof and operable to output an offset size control signal to the offset generation circuit according to a crossing detection result outputted from the crossing detector, wherein the offset generation circuit is further responsive to the offset size control signal in generating the offset.

5. The comparison device of claim 4, wherein the offset generation circuit includes:

an offset size adjuster coupled to the control circuit to receive the offset size control signal and responsive to the offset size control signal to adjust an offset size of the offset;
an offset controller coupled to the control circuit to receive the offset generation control signal and the offset size adjuster and operable to control a generation of the offset according to the offset generation control signal; and
an offset generator coupled to the offset size adjuster and the offset controller and operable to generate the offset of which the size is adjusted by the offset size adjuster according to the control of the offset controller.

6. The comparison device of claim 1, wherein the first input signal is a ramp signal and the second input signal is a pixel signal.

7. The comparison device of claim 1, wherein the first input signal is a pixel signal and the second input signal is a ramp signal.

8. An analog-to-digital conversion device, comprising:
   an offset generation circuit suitable for generating an offset according to an offset control signal;
   a comparison circuit suitable for comparing a first input signal with a second input signal to which the offset has been applied and outputting a comparison signal;
   a control circuit suitable for detecting a crossing of the first input signal and the second input signal according to the comparison signal outputted from the comparison circuit and outputting the offset control signal to the offset generation circuit; and
   a counter suitable for performing a counting operation based on the comparison signal outputted from the comparison circuit.

9. The analog-to-digital conversion device of claim 8, wherein the comparison circuit repeatedly performs a comparison process multi times during a row analog-to-digital conversion section, the comparison process comparing the first input signal with a third input signal and outputting the comparison signal at an initial time, the comparison process, after the initial time, comparing the first input signal with the second input signal to which the offset has been applied and outputting the comparison signal.

10. The analog-to-digital conversion device of claim 9, wherein the second input signal is generated by decreasing or increasing the third input signal by the offset outputted from the offset generation circuit.

11. The analog-to-digital conversion device of claim 8, wherein the control circuit includes:
    a crossing detector suitable for detecting the crossing of the first input signal and the second input signal according to the comparison signal of the comparison circuit and outputting an offset generation control signal to the offset generation circuit; and
    an offset size controller suitable for outputting an offset size control signal to the offset generation circuit according to a crossing detection result outputted from the crossing detector.

12. The analog-to-digital conversion device of claim 11, wherein the offset generation circuit includes:
    an offset size adjuster suitable for adjusting an offset size according to the offset size control signal outputted from the control circuit;
    an offset controller suitable for controlling a generation of the offset according to the offset generation control signal outputted from the control circuit; and an offset generator suitable for generating the offset of which the size is adjusted by the offset size adjuster according to the control of the offset controller.

13. The analog-to-digital conversion device of claim 8, wherein the first input signal is a ramp signal and the second input signal is a pixel signal.

14. The analog-to-digital conversion device of claim 8, wherein the first input signal is a pixel signal and the second input signal is a ramp signal.

15. A complementary metal oxide semiconductor (CMOS) image sensor, comprising:
- a pixel array comprising pixels arranged in rows and columns wherein each pixel is operable to generate a pixel signal corresponding to incident light received at each pixel;
- a row decoder coupled to the pixel array and operable to select and control pixels of the pixel array row by row;
- a ramp signal generation circuit structured to generate a ramp signal;
- an offset generation circuit suitable for generating an offset according to an offset control signal;
- a comparison circuit coupled to the ramp signal generation circuit to receive the ramp signal and operable to compare the ramp signal with a pixel signal to which the offset has been applied to output a comparison signal;
- a control circuit coupled to the comparison circuit to receive the comparison signal and operable to detect a crossing of the ramp signal and the pixel signal according to the comparison signal to generate the offset control signal to the offset generation circuit;
- a counter coupled to the comparison circuit to receive a version of the comparison signal and operable to perform a counting operation based on the comparison signal;
- a memory coupled to the counter and operable to store information outputted from the counter;
- a column read-out circuit coupled to the memory and operable to output the information stored in the memory; and
- a control circuit coupled to and operable to control, the row decoder, the ramp signal generation circuit, the comparison circuit, the counter, the memory and the column read-out circuit.

16. The CMOS image sensor of claim 15, wherein the comparison circuit repeatedly performs a comparison process multiple times during an analog-to-digital conversion, the comparison process comparing the ramp signal with the pixel signal and outputting the comparison signal at an initial time, the comparison process, after the initial time comparing the ramp signal with the pixel signal to which the offset has been applied and outputting the comparison signal.

17. A complementary metal oxide semiconductor (CMOS) image sensor, comprising:
- a pixel array suitable for outputting a pixel signal corresponding to incident light;
- a row decoder suitable for selecting and controlling pixels of the pixel array row by row;
- a ramp signal generation circuit suitable for generating a ramp signal;
- an offset generation circuit suitable for generating an offset according to an offset control signal;
- a comparison circuit suitable for comparing the pixel signal with the ramp signal to which the offset has been applied, and outputting a comparison signal;
- a control circuit suitable for detecting a crossing of the ramp signal and the pixel signal according to the comparison signal outputted from the comparison circuit, and outputting the offset control signal to the offset generation circuit;
- a counter suitable for performing a counting operation based on the comparison signal outputted from the comparison circuit;
- a memory suitable for storing information outputted from the counter;
- a column read-out circuit suitable for outputting of the information stored in the memory; and
- a control circuit suitable for controlling operations of the row decoder, the ramp signal generation circuit, the comparison circuit, the counter, the memory and the column read-out circuit.

18. The CMOS image sensor of claim 17, wherein the comparison circuit repeatedly performs a comparison process multiple times during a row analog-to-digital conversion, the comparison process comparing the ramp signal with the pixel signal and outputting the comparison signal at an initial time, the comparison process, after the initial time comparing the pixel signal with the ramp signal to which the offset has been applied and outputting the comparison signal.

19. An analog-to-digital conversion device, comprising:
- a comparator including a first input terminal receiving a signal to be sampled and a second input terminal receiving a ramp signal to be compared with the signal to be sampled;
- a plurality of capacitors coupled in parallel, each capacitor including one electrode couplable to one of a power supply voltage and a ground voltage;
- a plurality of switch circuits coupled in parallel, each switch circuit being coupled to one of the plurality of capacitors to connect the one of the plurality of capacitors to the first input terminal;
- an offset controller coupled to the plurality of switch circuits and configured to control a generation of an offset of the signal to be sampled;
- a control circuit to provide the plurality of switch circuits with an offset control signal when the voltage levels of the first and second input terminals become identical to each other, wherein the control circuit detects a crossing of the ramp signal and the signal to be sampled according to a comparison signal outputted from the comparator, and outputs the offset control signal to the offset controller; and
- a counter to output digital codes based on a voltage difference between the first and second input terminals,
- wherein the plurality of capacitors and the plurality of switch circuits are used as a charge pump that raises the voltage level of the first input terminal when the ramp signal has a positive slope and lowers the voltage level of the first input terminal when the ramp signal has a negative slope.

* * * * *